US005500836A

United States Patent [19]

Jeannet

[11] Patent Number: 5,500,836

[45] Date of Patent: Mar. 19, 1996

[54] CIRCUIT FOR SUPPRESSING THE EFFECT OF REBOUNDS AND PARASITIC COMMUTATIONS OF A CONTACTOR

[75] Inventor: Nicolas Jeannet, Colombier, Switzerland

[73] Assignee: Eta SA Fabriques d'Ebauches, Grenchen, Switzerland

[21] Appl. No.: 213,143

[22] Filed: Mar. 14, 1994

[30] Foreign Application Priority Data

Mar. 18, 1993 [CH] Switzerland .......................... 00820/93

[51] Int. Cl.$^6$ ...................................................... G09C 9/00

[52] U.S. Cl. ........................... 368/187; 368/321; 327/385

[58] Field of Search .................................... 368/155–157, 368/184–189; 327/384, 385

[56] References Cited

U.S. PATENT DOCUMENTS

| | | | |
|---|---|---|---|
| 4,083,176 | 4/1978 | Higashi | 368/187 |
| 4,138,613 | 2/1979 | Tanaka | 307/247 A |
| 4,358,837 | 11/1982 | Yamazaki et al. | 368/69 |
| 4,773,051 | 9/1988 | Soltermann | 368/187 |

FOREIGN PATENT DOCUMENTS

| | | |
|---|---|---|
| 0274035 | 7/1988 | European Pat. Off. . |
| 2282158 | 3/1976 | France . |

OTHER PUBLICATIONS

Patent Abstracts of Japan, "Input Line Switching Circuit", vol. 004, No. 121, 17 Aug. 1980.

*Primary Examiner*—Bernard Roskoski
*Attorney, Agent, or Firm*—Weil, Gotshal & Manges

[57] ABSTRACT

A circuit for suppressing the effect of rebounds of a contactor (2) on a control signal (C) produced thereby, wherein the contactor (2) ideally changes from one position to another position and remains in the other position for a predetermined time. The circuit comprises a sampling means (3) for sampling the control signal (C) at a first sampling rate (CLKA) and providing a output signal ($C_i$) being in either a first or a second state, a detecting means (4) for determining a change of said output signal ($C_i$) from one of said states to the other state, and a sampling prevention means (5) for preventing the sampling means (3) from sampling the control signal (C) for said predetermined time in response to the change in said output signal ($C_i$), in order that said output signal ($C_i$) remains in said other state for at least said predetermined time.

9 Claims, 3 Drawing Sheets

CIRCUIT FOR SUPPRESSING THE EFFECT OF REBOUNDS AND PARASITIC COMMUTATIONS OF A CONTACTOR

The present invention relates to circuits for suppressing the effect of rebounds and parasitic commutations of a contactor and for supplying a well-defined signal that is representative of the open or closed position of the contactor. The invention is suitable for use in analog electronic watches and it will be convenient to hereinafter disclose the invention in relation to that exemplary application. It is to be appreciated, however, that the invention is not limited to this application.

Many mechanical contactors cannot switch from an open position to a closed position without bouncing. In addition, parasitic commutations of the contactor are known to occur, and can be caused by the application of a shock to the contactor or by a temporary reduction in the force holding the contactor in one position or the other. Such bouncing and parasitic commutations of course adversely affect the signal produced by the contactor.

Certain contactors used in watches are found to experience these problems. This is for instance the case with analog electronic watches having a peripheral calendar and whose circuitry receives one or more daily signals produced by the contactor. This contactor, which generally consists of a pair of flexible blades, is actuated twice a day by a cam arranged on the drive shaft of the hours hand. In normal time-keeping operation, the contactor is closed by the cam twice a day, the switching time between the instant when the contact blades start touching each other and the instant when they touch each other firmly being something in the order of 1 to 2 minutes. The contactor ideally remains closed for about 30 minutes before the contact blades begin to separate. The switching time between the instant when the contact blades start to separate and the instant when they are completely separated is also about 1 to 2 minutes.

To save space and reduce torque on the cam, it is preferred to use flexible blades that travel over only a short distance and require the application of only a small force both for this travel and to keep the contact blades firmly touching one another. This renders the contactor particularly sensitive to impacts which may cause temporary openings or closures of the contact blades. Further, small errors in tolerance of the cam or contact blades or other mechanical alignment difficulties may result in the cam applying a force to the contact blades which is at times insufficient to keep them firmly touching one another. While not fully separating to an open position, a sufficiently high resistance may thus be established between the contact blades (which condition shall be referred to as a "bad" contact) to effectively open circuit the contactor. Such errors may also lead to variations in the switching time of the contact blades.

Circuits which address one or more of the above problems, which circuits are known as anti-rebound, debouncing or anti-chattering circuits, are well known. One such circuit comprises a one-shot flip-flop whose output issues a signal of a given duration in response to the first opening or closure of the contactor. As a result, the contactor's bounces immediately after the issuance of the signal produced by the contactor no longer have any effect on the signal if the duration of the latter is greater than the switching time of the contactor. This type of circuit is satisfactory in applications when it is is associated with a contactor which has a substantially constant switching time, whose contact blades remain firmly closed during operation of the contactor, and which is not affected by outside impacts. However, in other applications such a circuit is likely to provide erroneous data.

For example, if the contactor's switching time varies and exceeds the duration of the signal supplied by the circuit, the bouncing will still generate one of more undesirable signals, supplying false data. Such parasitic signals will also be generated by the circuit if the contactor moves from one position to the other while at rest, such as may result from accidental impacts of sufficient strength. The problems resulting from the appearance of one or more "bad" contacts during the period of ideal closure, as discussed above, are also not addressed by this circuit.

Another circuit, that is less sensitive to disturbances caused by impacts and which is described in swiss patent application Ser. No. 4130/74, essentially comprises a counter, able to count up to N, which when filled issues a signal at its output, and a generator which supplies a fixed frequency signal made up of a succession of pulses. When the contactor is closed the pulses are applied to the counter's input, whereas while the contactor is open the pulse flow is interrupted and the counter is reset.

Under these conditions and upon the contactor switching from the open position to the closed position, the counter is reset whenever the contactor opens because of bouncing or as a result of impacts. The pulse repetition frequency and the number N are furthermore so selected that during this period of instability on the part of the contact, the counter may not receive N consecutive pulses. Only after the final bounce, when the contactor is closed with sufficient force for it to be no longer sensitive to rebound shocks, will the counter, after having counted N pulses, issue a signal that is representative of the closed position of the contactor. However, repeated openings of the contact blades from impacts or "bad" contacts will continually reset the counter, so that a signal indicating the closure of the contactor may never issue.

An additional circuit, comprising a second counter and pulse generator, may be used to suppress to the effects of such unintended openings of the contact blades to some extent. For example, such a circuit may require that after a signal indicating the closure of the contactor has issued, the contact blades remain open for N consecutive pulses before the contactor is interpreted by the circuit as being in an open state. This circuit could thus suppress the effect of brief openings of the contact blades resulting from shocks to the contactor which occurred after the issuance of the closure signal.

However, a "bad" contact may appear during the time that the contactor is ideally closed, for periods longer than the duration of the brief openings resulting from shocks. If the contact blades are open during a period sufficiently long for the second counter to receive N successive pulses, this circuit will interpret the contactor as being in an open state. If the contact blades subsequently close again for a period sufficiently long for the first counter to receive another N successive pulses, a second signal erroneously indicating that the contactor has again closed will issue.

An object of the present invention is to provide a circuit for suppressing the effect of rebounds and parasitic commutations of a contact which overcomes or alleviates the disadvantages of known anti-rebound circuits.

With that object in mind, the present invention provides a circuit for suppressing the effect of rebounds and parasitic commutations of a contactor on a control signal produced by the contactor. The control signal is in a first state when the contactor is open and in a second state when the contactor is closed. The contactor ideally changes from one of such positions to the other position and remains in such other position for a predetermined time. The circuit includes sampling means for sampling the control signal at a first sampling rate and providing an output signal in either a first state or a second state. Also provided are detecting means for determining a change of the output signal from one of such states to the other state, and sampling prevention means for preventing the sampling means from sampling the control signal for such predetermined time in response to the change in state of the output signal, in order that the output signal remains in the other state for at least the predetermined time.

Thus, a well-defined signal representative of the position of the contactor is provided which has a state having a duration at least equal to the ideal time of closure of the contactor, which state is not affected by the openings and closings of the contact blades from shocks or "bad" contacts during this ideal closure time.

The following decription refers in more detail to the various features of the circuit for suppressing the effects of rebounds and parasitic commutations of a contactor of the present invention. In order to facilitate an understanding of the invention, reference is made in the description to the accompanying drawings where the circuit is illustrated in a preferred embodiment. It is to be understood that the circuit of the present invention is not limited to the preferred embodiment as illustrated in the drawings.

Figure 1:
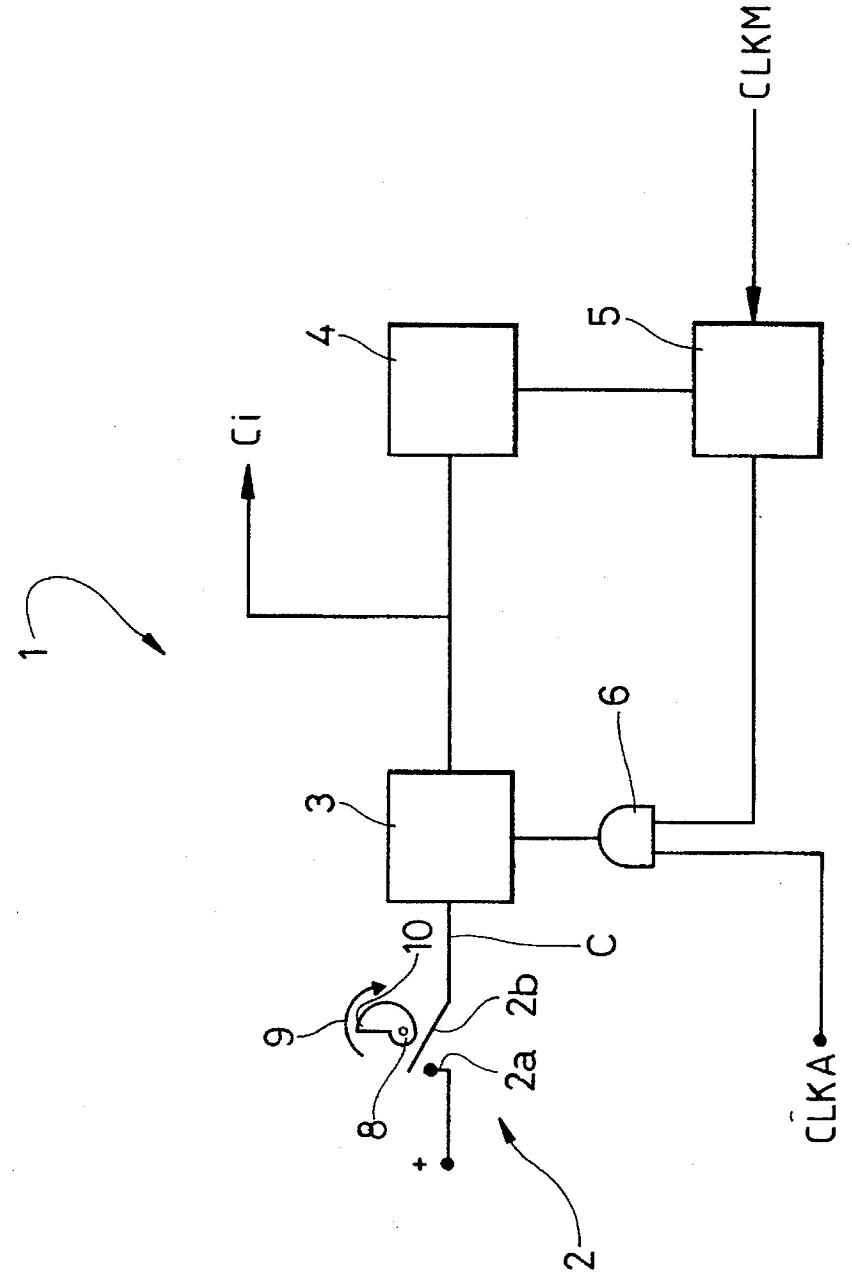
FIG. 1 is a schematic block diagram of an embodiment of the circuit according to the present invention.

Referring now to FIG. 1 of the drawings, there is shown a schematic block diagram of a circuit 1 according to the present invention, having a mechanical contactor 2, a sampling circuit 3, a change-of-state detector 4 and a timing circuit 5. The mechanical contactor 2 comprises a stationary blade 2*a* and a movable blade 2*b* which do not touch each other at rest. The contactor 2 is operated by a cam 8 that is rotatably driven by a shaft turning in one direction 9 only and which is provided on its periphery with a tooth 10. As the tooth 10 moves, it actuates the blade 2*b* which then touches the blade 2*a*, causing the contact 2 to move from an open position to a closed position.

The blade 2*a* is connected to a positive voltage supply, so that when the contactor 2 is in a closed position, a logically high signal C is sent to the sampling circuit 3. Conversely, when the contactor 2 is open, the signal C is logically low.

The sampling circuit 3 normally samples the level of the signal C at a rate determined by a clock signal CLKA. An output signal $C_i$, having a high or a low state according to the logically high or low level of the signal C at each moment of sampling, is sent from the sampling circuit 3 to the change-of-state detector 4.

When the state of the signal $C_i$ remains constant, the detector 4 supplies a logically low signal to the timing circuit 5. This in turn causes the timing circuit 5 to send a logically high signal to one input of an AND gate 6. The clock signal CLKA is connected to the other input of the AND gate 6, so that under these conditions, the signal C is sampled by the sampling circuit 3 at a rate set by the clock signal CLKA.

The detection of a change in the state of the signal $C_i$ causes the detector 4 to supply a logically high signal to the timing circuit 5. When this logically high signal is read by the timing circuit 5, a logically low signal is supplied to said one input of the AND gate 6, so as to prevent pulses from the clock signal CLKA being sent to the sampling circuit 3 and thus inhibit the sampling of the signal C.

The timing circuit 5 supplies this logically low level signal to the AND gate 6 for a period equal to the ideal closure time of the contactor 2. This period may, for example, be set by the inclusion of a counter in the timing circuit 5, which counter may commence counting from the instant the logically high signal is read from the detector 4 and may increment at a rate determined by a clock signal CLKM. At the end of the set period, the timing circuit 5 again supplies a logically high signal to said one input of the AND gate 6, so that pulses from the clock signal CLKA are sent to the sampling circuit 3 to once more enable the sampling of the signal C. The state of the signal $C_i$ is thus held constant during this ideal closure period and is not affected by openings of the contact blades 6 and 7 resulting from impact shocks, "bad" connections and the like.

Figure 2:
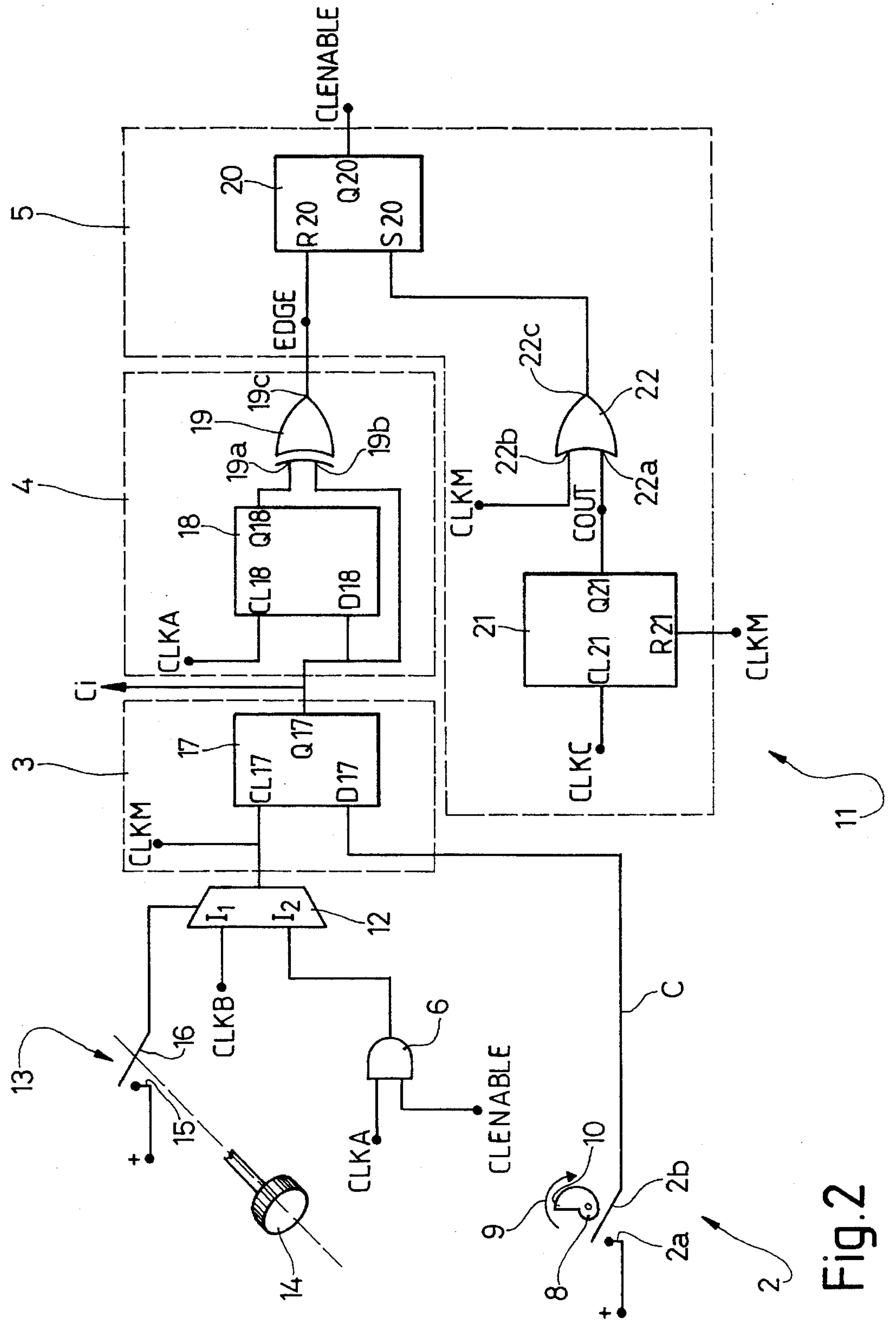
FIG. 2 is circuit diagram one embodiment of the block diagram of FIG. 1; and, FIG. 3 is a timing diagram for explaining the functioning of the circuit diagram of FIG. 2.
Figures 3A, 3B, 3C, 3D, 3E, 3F, 3G, 3H:
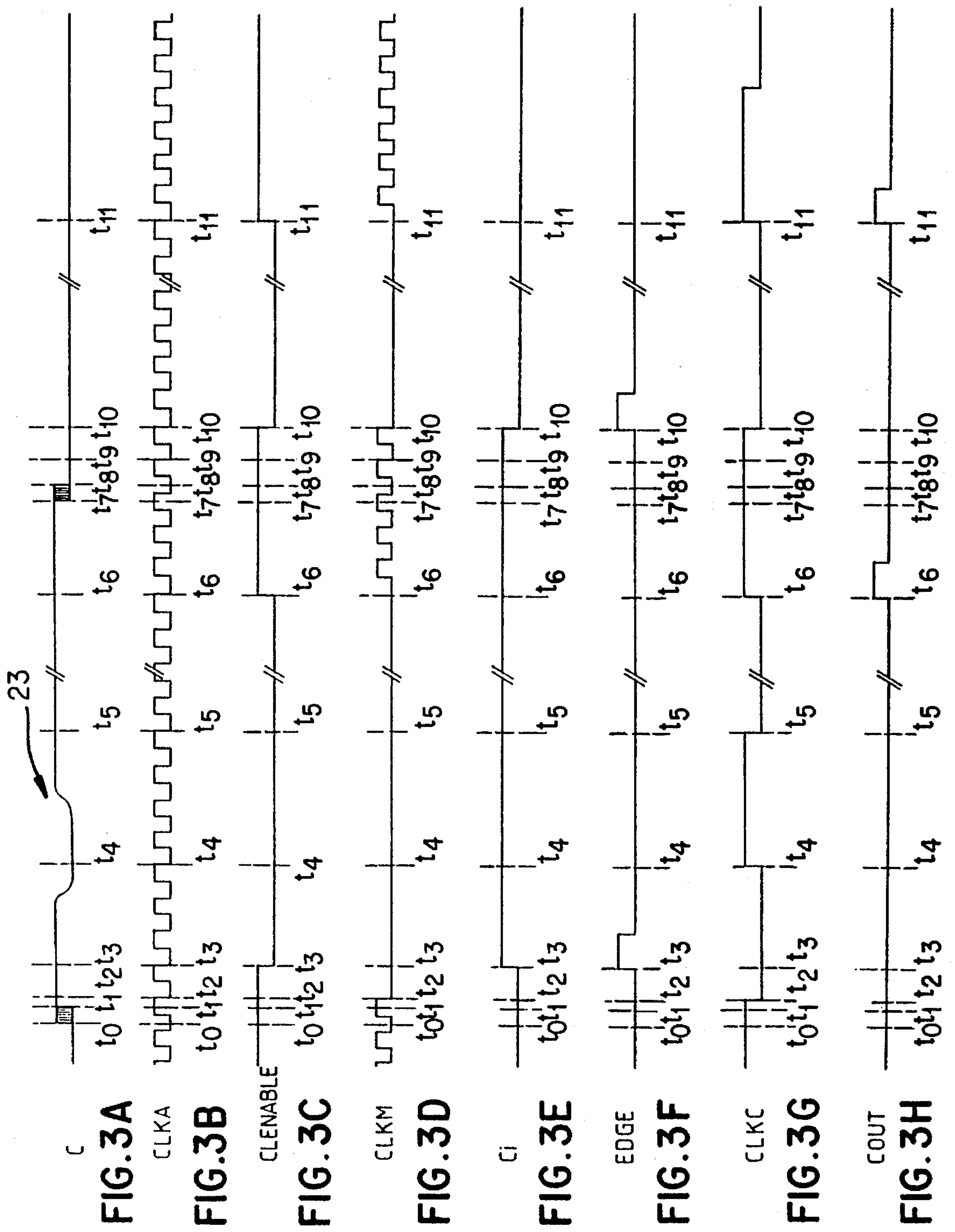

Reference will now be made to FIGS. 2 and 3, wherein one way of realising the block diagram shown in FIG. 1 and an associated timing diagram will be used to more clearly explain the present invention. FIG. 2 shows a circuit 11 comprising the mechanical contactor 2, sampling circuit 3, change-of-state detector 4, timing circuit 5 and AND gate 6, as referenced in FIG. 1. The circuit 11 also comprises a multiplexer 12 and another mechanical contactor 13 actuated by a crown 14.

The contactor 13 comprises a fixed blade 15 and a movable blade 16 which do not touch each other at rest. The contact blades 15 and 16 are caused to touch each other firmly when the crown 14 is set to a time-adjusting position, and caused to open again when the crown 14 is set to a time-keeping position. The blade 15 is connected to a positive voltage supply, so that when the contactor 13 is in a closed position, a logically high signal is sent to the multiplexer 12, and when the contactor 13 is open, the signal sent is logically low.

The sampling circuit 3 comprises a delay flip-flop 17 having its input D17 connected to the contact blade 7 of the contactor 2. The flip-flop 17 has its clock input CL17, which determines the rate at which the signal at the input D17 of the flip-flop 17 is sampled, the signal to which is provided by the multiplexer 12. A clock signal CLKB is connected to one input $I_1$ of the multiplexer 12. A further clock signal, which is the combination of the clock signal CLKA and the sampling control signal CLENABLE by the AND gate 6, is connected to another input $I_2$ of the multiplexer 12. When the contactor 13 is closed, the logically high signal sent to the muliplexer causes the clock signal at the input $I_1$ to be sent to the sampling circuit 3. Conversely, when the contactor 13 is open, the signal at the input $I_2$ is sent to the sampling circuit 3.

The change-of state detector 4 comprises another delay flip-flop 18 and an exclusive-OR (XOR) gate 19. The flip-flop 18 has its input D18 connected to the output Q17 of the flip-flop 17, its clock input CL18 provided by the clock signal CLKA and its output Q18 connected to one input 19*a* of the XOR gate 19. The other input 19*b* of the XOR gate 19 is connected to the input D18 of the flip-flop 18.

When the state of the signal at the input D18 of the flip-flop 18 is unchanged over consecutive cycles of the clock signal CLKA, the input D18 and the output Q18 of the flip-flop 18 will both have the same state. The XOR gate 19 will thus produce a logically low signal at its output 19*c*. However, when the signal at the input D18 of the flip-flop 17 changes between consecutive cycles of the clock signal CLKA from a logically low to high signal (or vice-versa), the output 19*c* will, for one cycle of the clock signal CLKA, send a logically high pulse to the timing circuit 5.

The timing circuit 5 comprises a reset-set (RS) flip-flop 20, a counter 21 and an OR gate 22. The RS flip-flop 20 has its reset input R20 connected to the output 19*c* of the XOR gate 19, so that the logically high pulse sent from the detector 4 will reset the RS flip-flop 20 and cause a logically low signal to appear at its output Q20. The signal CLENABLE is provided by the output Q20.

The counter 21 has a reset input R21 which, when a logically high signal is applied to it, resets the counter 21 to zero. A clock input CL21 is provided to set the rate at which the counter 21 increments when in operation. The counter 21 also has an output Q21 which supplies a logically high signal to an input 22*a* of the OR gate 22 when the counter 21 has incremented a predetermined number of times. The output of the multiplexer 12 provides a clock signal CLKM to the other input 22*b* of the OR gate 22 and to the reset input R21 of the counter 21. When either the output Q21 or the signal CLKM goes high, a logically high signal is sent from the output 22*c* of the OR gate to the set input S20 of the RS flip-flop 20, which causes the CLENABLE signal provided by the output Q20 to be set to a logically high level.

The operation of the circuit 11 when a time-adjustment is performed will now be explained. When the crown 14 is set to a time-adjusting position, the contactor 13 closes and a logically high signal is sent to the multiplexer. The clock signal CLKB is thus sent via the output of the multiplexer 12 to the clock input CL17 of the flip-flop 17. In this position, the crown 14 may be rotated in one direction so as to cause the rotation of the cam 8 in the direction 9.

As explained previously, in normal time-keeping mode the cam 8 turns slowly enough so that the contactor 8 may ideally stay closed for a period in the order of 30 minutes. However, in time-adjusting mode, the rotation of the cam 8 is controlled by the crown 14 and may thus be much more rapid. Since a fast sampling rate is needed to monitor the state of the signal C from the contactor 2 under these conditions, the clock signal CLKB, which sets this sampling rate, needs to have a high frequency, and may be in the order of 500 samples/second.

When the cam 8 is in the position shown in FIG. 2, the contactor 2 is open and a logically low signal is applied to the input D17 of the flip-flop 17. With each trailing edge of the clock signal CLKB, the logically low state of the signal C is read by the flip-flop 17 and presented at the output Q17. When the cam 8 is rotated to a position whereby its tooth 10 presses the contact blades 2*a* and 2*b* together, the signal C sent to the input D17 goes high. At the next trailing edge of the clock signal CLKB, this logically high state is read by the flip-flop 17 and presented at its output Q17. This output Q17 provides the signal $C_i$ which is used to indicate the state of the contactor 2. The detector 4 and the timing circuit 5 are caused to operate by the change in state of the signal C, but this operation has no effect on the sampling circuit 3.

The operation of the circuit 11 in normal time-keeping mode will now be described. When the crown 14 is set to the time-keeping position, the contactor 13 is caused to be open so that a logically low signal is applied to the multiplexer 12. When the cam 8 is in the position shown in FIG. 2, and the contactor 2 has been open for some time, the signal CLENABLE is high. The clock signal CLKA thus appears at the output of the AND gate 6 and is sent by the multiplexer 12 to the clock signal input CL17, so that the signal C is sampled at the rate set by the clock signal CLKA.

Twice every twenty four hours, the rotation of the cam 8 causes its tooth 10 to press the contact blades 2*a* and 2*b* together and thereby close the contactor 2. As explained previously, this transition is not clean-cut but involves a series of rebounds between the instants to and $t_1$, as represented by the plot of the signal C in FIG. 3. This series of rebounds may last in the order of 1 to 2 minutes. The signal C is sampled on the trailing edge of the clock signal CLKM, which at the instants $t_0$ and $t_1$ has the same form as the clock signal CLKA.

When the signal C is sampled at the instant $t_2$, the contactor 2 has changed state so that a logically high signal is supplied to the input D17. At the following trailing edge of the clock signal CLKA (instant $t_3$), the output Q17, and thus the signal $C_i$, go high so that a logically high signal is sent to the input 19*b* of the XOR gate 19. Since the output Q18 will not go high until the following trailing edge of the clock signal CLKA supplied to the D flip-flop 18, the output 19*c* of the XOR gate 19 (labelled EDGE in FIG. 2) also goes high at the instant $t_3$ for one clock period. This in turn supplies a logically high signal to the reset input R20, so that at the signal CLENABLE is caused to go low. The clock signal CLKA is thus prevented from being sent to the clock input CL17 from the instant $t_3$, so that the signal CLKM remains low and the signal C is no longer sampled. The signal $C_i$ therefore remains in an unchanging state.

The clock signal CLKA may have a period of about 1 minute, so that, for example, a shock causing the contact blades 6 and 7 to close before the instant to and an instant at which the signal C is sampled are unlikely to occur concurrently. In order to guard against this possibilty however, another embodiment of the sampling circuit 3 can easily be envisaged which requires that two or more consecutive samples of the signal C have the same state, thus verifying that the contactor 2 has indeed changed state, before the state of the signal $C_i$ is correspondingly changed. The prior-art anti-rebound circuits described in the introductory pages may be used in other embodiments of the sampling circuit 3 to detect the intended opening and/or closing of the contactor 2.

The period during which the signal C remains unsampled is determined by the counter 21 and may correspond to the ideal closing time of the contactor 2. In the case where the contactor 2 is used in an analog electronic watch and is closed by a cam driven by the hours-hand shaft of the watch, this time may be between 26 and 30 minutes. When the contactor 2 is open and the signal CLKM has the same form as the clock signal CLKA, the counter 21 is reset to zero with each trailing edge of the signal CLKM. However, the logically low state of the signal CLKM from the instant $t_3$ onwards enables the counter 21 to count a predetermined number of state changes in the signal CLKM, as represented at the instants $t_4$ and $t_5$, and issue a logically high pulse at its output Q21 (labelled COUT in FIG. 2) when this predetermined number is reached at the instant $t_6$. It can be seen that the signal $C_i$ remains constant at least between the instants $t_3$ and $t_6$, and is not affected by changes in the state of the contactor 2 caused by the shock of impacts or "bad" contacts, as indicated by the reference 23, which may occur during this time.

The pulse from the output Q21 is sent via the OR gate 22 to the set input S20 of the RS flip-flop 20, so that the signal CLENABLE from the output Q20 is caused to return to a logically high level. The clock signal CLKA is thus now able to be sent, via the AND gate 6 and multiplexer 12, to the clock input CL17, so that from the instant $t_6$ the signal CLKM again has the form of the clock signal CLKA and the signal C is again sampled on each trailing edge of the signal CLKM.

At an instant $t_7$, the cam 8 has rotated through a sufficiently large angle for the contact blades 6 and 7 to commence opening. Rebounds between the contact blades 6 and 7 continue until an instant $t_8$, after which they remain separated from one another. The period between the instants $t_7$ and $t_8$ may be in the order of 1 to 2 minutes. The signal C therefore returns to a logically low level. At the first trailing edge of the signal CLKM, as seen at instant $t_9$, this low level is read by the D flip-flop 17. On the following trailing edge of the signal CLKM, at the instant $t_{10}$, the low level of the signal C is transferred to the output Q17, so that the signal $C_i$ also goes low.

As described previously, the change in state of the output Q17 results in a difference in the states of the inputs 19*a* and 19*b* of the XOR gate 19 for one cycle of the signal CLKA, so that a logically high pulse is applied to the reset input R20 of the RS flip-flop 20. This causes the signal CLENABLE to go low, and again block the receipt of the signal CLKA by the D flip-flop 17, and the sampling of the signal C, during a period set by the counter 21. When the counter 21 has counted a predetermined number of state changes of the signal CLKC, at the instant $t_{11}$, the output Q21 issues a pulse which is sent to the set input S20 to as to return the signal CLENABLE to a logically high level and allow sampling of the signal C to recommence.

Whilst the change in state of the signal $C_i$ in FIG. 3 at the instant $t_{10}$ results from the intended opening of the contactor 2, such a change in state may also be caused by the occurence of a "bad" contact after the instant $t_6$. The detection of this "bad" contact will cause the sampling of the signal C to cease during the predetermined time set by the counter 21, and thus the signal $C_i$ to be low during this time. However, the signal $C_i$ has already provided a well-defined signal representative of the closure of the contactor 2 between the instants $t_3$ and the instant $t_6$ and so this parasitic commutation has no effect on the circuit 11. In addition, the period between the instant $t_6$, which represents the end of the ideal closure time of the contactor 2, and $t_7$, the actual closure time of the contactor 2, is sufficiently short in comparison to the time during which the signal C is subsequently not sampled, to prevent the signal $C_i$ going high again before the instant $t_8$.

Similarly, the early closure of the contactor 2, before the instant $t_6$, has no effect on the circuit 11, as the state of the signal $C_i$ remains high for at least the ideal closure time of the contactor 2, as set by the counter 21.

Whilst the sampling of the signal C does not cease when a watch using the circuit 11 is time-adjusted, it is to be appreciated that in other applications this may be desirable. For example, the clock signal CLKB may be connected to one input of another AND gate, the output of which is connected to the input I1 of the multiplexer 12. Another timing circuit may be provided to receive the pulse from the output 19*c* of the detector 4, and provide a logically low signal to the other input of the additional AND gate so as to prevent sampling of the signal C for another fixed period. If the clock signal CLKB has a period of 20 ms, this period may be in the order of 100 ms.

Finally, it is to be understood that various other modifications and/or additions may be made to the circuit without departing from the ambit of the present invention as defined in the claims appended hereto.

I claim:

1. A circuit for suppressing the effect of rebounds and parasitic commutations of a contactor (2) on a control signal (C) produced by said contactor (2), having open and closed positions, said contactor (2) ideally changing from one of its two positions to the other of its two positions and remaining in said other position for a predetermined time, characterised in that said circuit comprises:

sampling means (3) for sampling said control signal (C) at a first sampling rate (CLKA) and providing a output signal ($C_1$) being in either a first state corresponding to an open position of the contactor or a second state corresponding to a closed position of the contactor, detecting means (4) for determining a change of said output signal ($C_1$) from one of said states to the other state, and sampling prevention means (5) for preventing said sampling means (3) from sampling said control signal (C) for said predetermined time in response to the change in state of said output signal ($C_1$), in order that said output signal ($C_1$) remains in said other state for at least said predetermined time.

2. A Circuit according to claim 1, characterised in that said detecting means (4) includes means for determining the change of state of said output signal ($C_1$) by detecting when two or more consecutive samples of said control signal (C) are in said other state.

3. Apparatus for controlling an analog electronic watch comprising signal means;

a contactor connected to said signal means for producing a control signal having a first state when said contactor is open and a second state where said contactor is closed;

a rotary cam for controlling said contactor;

sampling means for sampling said control signal at a first sampling rate and providing a output signal being in either a first state corresponding to an open position of the contactor or a second state corresponding to a closed position of the contactor, detecting means for determining a change of said output signal from one of said states to the other state, and sampling prevention means for preventing said sampling means from sampling said control signal for said predetermined time in response to the change in state of said output signal in order that said output signal remains in said other state for at least said predetermined time.

4. The apparatus of claim 3 further including a shaft, said cam being rotationally driven by said shaft when said watch is operating in a time keeping mode.

5. A circuit according to claim 4, characterised in that said shaft is an hours-hand shaft.

6. A circuit according to claim 4, further including a rotatable time-setting crown (14), said cam (8) being rotatably driven by said crown (14) while said watch is operating in a time-adjusting mode.

7. A circuit according to claim 6, characterised in that said sampling prevention means (5) is inoperable when said watch is in a time-adjusting mode time-set, said sampling means (3) sampling said control signal at a second sampling rate (CLKB) while said watch is operating in said time-adjusting mode.

8. A circuit according to claim 5, further including a rotatable time-setting crown (14), said cam (8) being rotatably driven by said crown (14) while said watch is operating in a time-adjusting mode

9. A circuit according to claim 8, characterised in that said sampling prevention means (5) is inoperable when said watch is operating in a time-adjusting mode, said sampling means (3) sampling said control signal at a second selected sampling rate (CKLB) while said watch is operating in a time-adjusting mode.

* * * * *